United States Patent
Virnig et al.

(10) Patent No.: US 6,599,414 B1
(45) Date of Patent: Jul. 29, 2003

(54) SOLVENT EXTRACTION PROCESSES FOR METAL RECOVERY

(75) Inventors: Michael J. Virnig, Tucson, AZ (US); G. Timothy Fisher, Tucson, AZ (US)

(73) Assignee: Cognis Corporation, Gulph Mills, PA (US)

( * ) Notice: Subject to any disclaimer, the term of this patent is extended or adjusted under 35 U.S.C. 154(b) by 0 days.

(21) Appl. No.: 09/924,000

(22) Filed: Aug. 7, 2001

(51) Int. Cl.$^7$ .................. C25C 1/12; C22B 15/14; B01D 11/04
(52) U.S. Cl. .............. 205/581; 205/574; 205/580; 205/585; 205/586; 75/721; 75/740; 75/744; 423/23; 423/24; 423/27
(58) Field of Search ................ 205/574, 580, 205/581, 585, 586; 423/23, 24, 27, 138, 139, 150.1, 150.3, DIG. 14; 75/721, 740, 744

(56) References Cited

U.S. PATENT DOCUMENTS

| | | |
|---|---|---|
| 3,224,873 A | 12/1965 | Swanson |
| 3,428,449 A | 2/1969 | Swanson |
| 3,952,775 A | 4/1976 | Ogata |
| 4,020,105 A | 4/1977 | Ackerley et al. |
| 4,020,106 A | 4/1977 | Ackerley et al. |
| 4,029,704 A | 6/1977 | Anderson |
| 4,085,146 A | 4/1978 | Beswick |
| 4,173,616 A | 11/1979 | Koenders et al. |
| 4,507,268 A | 3/1985 | Kordosky et al. |
| 4,544,532 A | 10/1985 | Kordosky et al. |
| 4,582,689 A | 4/1986 | Kordosky |
| 4,594,132 A * | 6/1986 | Satchell et al. .............. 205/581 |
| 4,957,714 A | 9/1990 | Olafson et al. |
| 5,948,264 A * | 9/1999 | Dreisinger et al. .......... 210/673 |
| 6,432,167 B1 | 8/2002 | Virnig et al. .................. 75/721 |

FOREIGN PATENT DOCUMENTS

GB  1 322 532  7/1973

OTHER PUBLICATIONS

G. M. Ritcey and A. W. Ashbrook, "Solvent Extraction: Principles and Applications to Process Metallurgy", Part II, Process Metallurgy 1, Elsevier Scientific Publishing Company, (1979), pp. 227–229 & 312–313.

* cited by examiner

Primary Examiner—Nam Nguyen
Assistant Examiner—Brian L Mutschler
(74) Attorney, Agent, or Firm—John E. Drach

(57) ABSTRACT

An improvement in the solvent extraction process for recovering metal values, i.e. copper, from acidic aqueous solutions containing copper and iron which may also include chloride, and more particularly to an improvement which provides for increased copper to iron ratios in the loaded organic extractant phase. The improvement comprises washing the loaded organic extractant phase prior to stripping of the copper values therefrom with an aqueous acidic wash solution containing at least a portion of electrolyte solution, wherein the wash solution or the electrolyte solution has been previously contacted with copper metal.

19 Claims, 1 Drawing Sheet

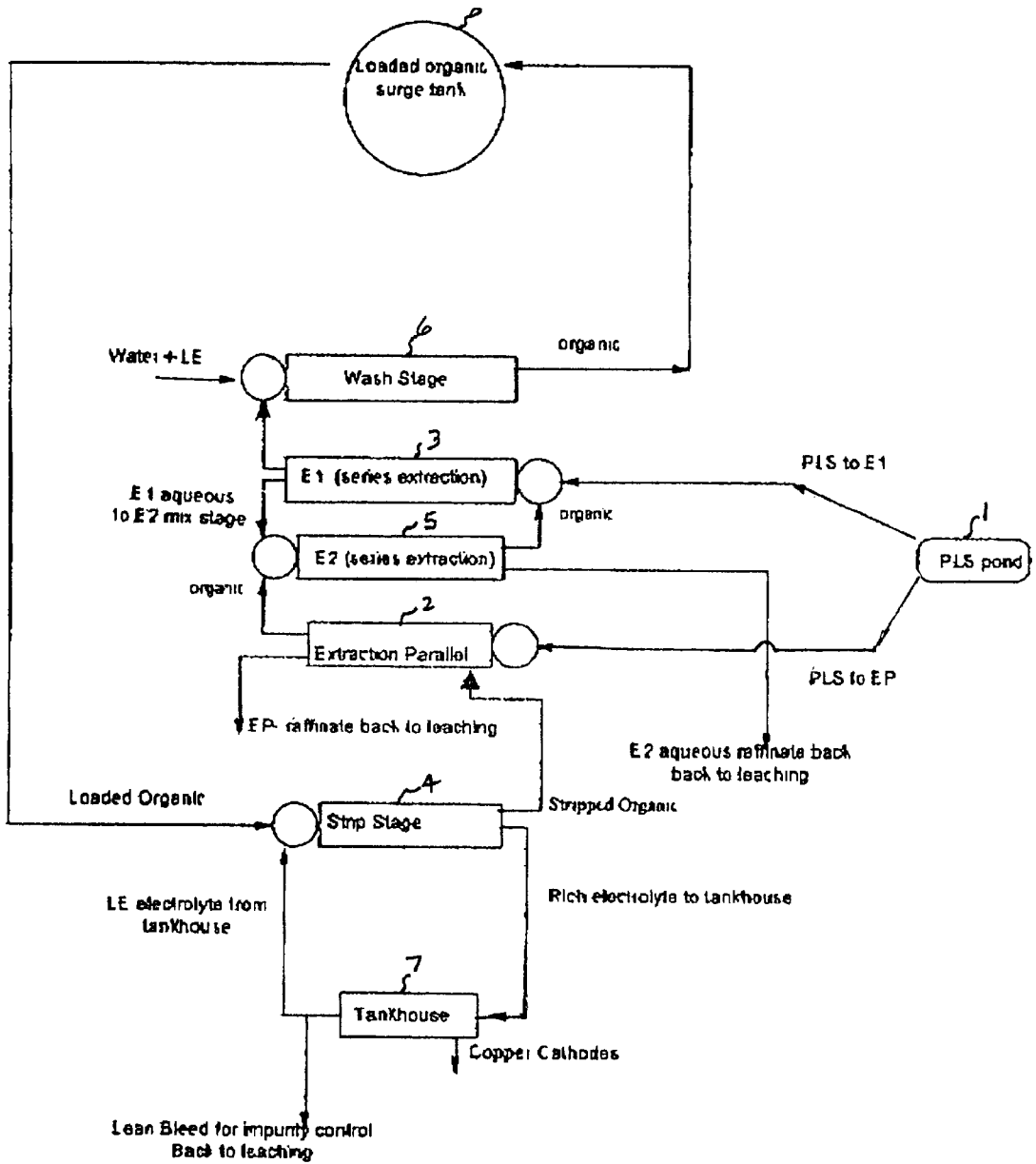
FIGURE

SOLVENT EXTRACTION PROCESSES FOR METAL RECOVERY

FIELD OF THE INVENTION

The present invention relates to solvent extraction processes for the recovery of metal values from aqueous solutions.

BACKGROUND OF THE INVENTION

In the process for extracting copper from a copper pregnant aqueous acidic leach solution (PLS) obtained by the extraction of copper from copper ores, wherein a water-immiscible organic solvent solution containing an extraction reagent is mixed with the copper pregnant aqueous acidic leach solution to form a copper loaded organic solvent solution, trace amounts of Fe(III) as well as other impurities such as Mn(II) from the acidic leach solution are also transferred to the organic solvent solution by chemical loading as well as by entrainment of the acidic leach solution. When an aqueous electrolyte solution is used to strip the copper from the loaded organic solvent solution, the Fe(III) and other impurities contained in the entrained acidic leach solution present in the organic solvent solution and the Fe(III) and other impurities chemically loaded therein are transferred to the aqueous electrolyte strip solution.

Hence, a variety of impurities can thereby be transferred to the electrowinning tankhouse from the aqueous electrolyte strip solution. These impurities can cause difficulties in the electroplating of copper. Manganese(II) and chloride ions are examples of impurities that reach the tankhouse by entrainment. Manganese(II) can be converted to insoluble manganese dioxide at the anode surface, where it precipitates. The manganese dioxide layer causes some spalling of the anode surface to form fine lead particles that in turn become incorporated into the copper cathode, resulting in poor quality cathode. Chloride can be converted to chlorine gas at the anode representing a health hazard for the tankhouse personnel. The presence of high levels of chloride in the tankhouse also results in pitting of the stainless steel blanks used to plate the copper which in turn results in cathode sticking, requiring labor intensive (expensive) manual stripping of the copper cathodes. As discussed above, iron(III) is an example of an impurity that is transferred by chemical loading. The presence of high levels of iron in the electrolyte results in high plating costs due to poor current efficiency. Iron(III) is reduced to iron(II) at the cathode while iron(II) is converted to iron(III) at the anode effectively causing a short circuit in the electrowinning cell. While a small amount of Fe is desirable in the tankhouse (0.5–1.5 gpl), higher levels are undesirable due to the effect on current efficiency. To control the Fe in the tankhouse electrolyte, operators periodically bleed the tankhouse and replace the bled volume with fresh water, sulfuric acid, and electrowinning additives such as guar, cobalt sulfate, and anti-misting aids. This results in substantial cost. The bleed is typically mixed with incoming PLS and fed to extraction to recover the copper, or a portion is added to the wash stage to control the acidity in the wash stage aqueous and provide some additional copper which is extracted by the reagent and helps to crowd the Fe(III) off the organic. While the acid values in the bleed are not truly lost since they eventually find their way to the acid leaching solution used to leach copper from copper ore, the other tankhouse additives in the bleed are lost and represent a substantial cost.

In order to minimize the transfer of Fe(III) from the loaded organic solvent solution to the aqueous electrolyte strip solution, one or more wash stages using at least a portion of electrolyte as the wash solution were introduced into the process to wash the loaded organic solvent solution prior to its contact with the aqueous electrolyte strip solution. This invention relating to the use of at least a portion of electrolyte as the wash solution forms the subject matter of U.S. Pat. No. 4,957,714.

SUMMARY OF THE INVENTION

It has now been discovered that when the aqueous phase used in the wash stage is first contacted with copper metal, a significant increase in the removal of iron ions from the loaded organic solvent solution is obtained when the wash aqueous phase is contacted therewith, i.e. iron scrubbing efficiency is significantly improved.

It has also been discovered that increasing the temperature of the wash aqueous phase before contact with the copper metal further enhances the iron scrubbing efficiency of the aqueous phase.

BRIEF DESCRIPTION OF THE DRAWING

The FIGURE shows a solvent extraction system that can be used in the practice of the invention using a series-parallel setup with one wash stage and one strip stage.

DETAILED DESCRIPTION

Other than in the operating examples, or where otherwise indicated, all numbers expressing quantities of ingredients or reaction conditions used herein are to be understood as modified in all instances by the term "about".

The starting material for large scale solvent extraction processing of copper is an aqueous leach solution obtained from a body of ore which contains a mixture of metals in addition to copper. The leaching medium dissolves salts of copper and other metals as it trickles through the ore, to provide an aqueous solution of the mixture of metal values, constituting the feedstock (PLS) for the extraction process. The metal values are usually leached with aqueous sulfuric acid, providing an acidic aqueous solution.

The aqueous solution is mixed in tanks with an extraction reagent which is dissolved in an organic solvent, e.g., a petroleum fraction. The reagent includes an extractant chemical which selectively forms metal-extractant complex with the copper ions in preference to ions of other metals. The step of forming the complex is called the extraction or loading stage of the solvent extraction process.

The outlet of the mixer continuously feeds to a large settling tank, where the organic solvent (organic phase), now containing the copper-extractant complex in solution, is separated from the depleted aqueous solution (aqueous phase). This part of the process is called phase separation. Usually, the process of extraction is repeated through two or more mixer/settler stages, in order to more completely extract the desired metal.

Where two or more mixer-settler stages are employed for extraction, countercurrent flow of the feedstock aqueous solution and the organic phase or reagent solution is employed. In a typical 3-stage extraction system, for example, the feedstock will flow through an initial mixer-settler stage and subsequently through a second mixer-settler stage. Feed is also introduced into a third extraction stage, and is contacted with organic from a strip stage. The organic phase will in turn, initially contact the feedstock in the third extraction stage, encounter a subsequent contact in the second extraction stage, and a final contact in the first extraction stage. As a result, by the time the feedstock reaches the second extraction stage substantial amounts of copper will have been extracted from it and it will be contacting an organic phase containing copper. Correlatively, when the organic phase reaches the first extraction stage, much of the extractant will be in the form of a copper-extractant complex, and the organic phase will be contacting the feedstock solution when it is in a condition wherein little, if any, of the dissolved copper has been extracted.

After extraction, the depleted aqueous feedstock (raffinate) is either discharged or recirculated to the ore body for further leaching. The loaded organic phase containing the dissolved copper-extractant complex is fed to another mixer tank, where it is mixed with an aqueous strip solution of concentrated sulfuric acid.

Stripped or spent electrolyte from the electrowinning step may be employed at least in part as the strip solution. The highly acid strip solution breaks apart the copper-extractant complex and permits the purified and concentrated copper to pass to the strip aqueous phase. As in the extraction process described above, the mixture is fed to another settler tank for separation. This process of breaking the copper-extractant complex is called the stripping stage, and the stripping operation may be repeated through one or more additional mixer-settler stages to more completely strip the copper from the organic phase.

From the stripping settler tank, the regenerated stripped organic phase is recycled to the extraction mixers to begin extraction again, and the strip aqueous phase is customarily fed to an electrowinning tankhouse, where the copper metal values are deposited on plates by a process of electrodeposition. After electrowinning the copper values from the aqueous solution, the solution, known as spent electrolyte, is returned to the stripping mixers to begin stripping again.

In the above process, a wash stage is typically employed to wash the loaded organic phase before it is sent to the stripping stage.

The process for using an improved wash stage solution, i.e. using at least a portion of the electrolyte therein, is disclosed in U.S. Pat. No. 4,957,714, which is expressly incorporated herein by reference.

One useful continuous process for extracting copper from copper-pregnant acidic leach solution is shown in the attached FIGURE, and this process can be used in the practice of the present invention. It should be noted, however, that the present invention can be used with any copper extraction process that involves the use of PLS and organic solvent solutions containing an extractant.

Copper-pregnant acidic aqueous leach solution (PLS), present in PLS pond (1) is sent to both extraction tank (2) and series extraction tank E1 (3). Stripped organic solvent solution from strip stage (4) is added to extraction tank (2) and mixed. Organic solvent solution from series extraction tank E2 (5) is added to series extraction tank E1 (3). Loaded organic solvent solution from series extraction tank E1 (3) is sent to wash stage (6) comprised of a mixer and a settler (mixer and settler not shown). An acidic wash solution, usually comprising a mixture of water and lean electrolyte (LE) obtained from tankhouse (7) is added to the mixer where it is mixed with the loaded organic solvent solution, and the mixture is sent to the settler. After settling, the washed loaded organic solvent solution is sent to loaded organic surge tank (8), and the mixture of water and electrolyte is recirculated back to the mixer. The electrolyte used to form the mixture of water and electrolyte used in wash stage (6) can be pregnant (rich) electrolyte from strip stage (4) instead of the lean electrolyte from tankhouse (7).

The washed loaded organic solvent solution from loaded organic surge tank (8) is sent to strip stage (4). Lean electrolyte (LE) from tankhouse (7), after bleeding for impurity control, is sent to strip stage (4) to strip the washed loaded organic solvent solution. The copper pregnant electrolyte solution from strip stage (4) is sent to tankhouse (7) to electrowin copper metal therefrom.

The stripped organic solvent solution from strip stage (4) is sent to extraction tank (2). The aqueous raffinate from extraction tank (2) is added to the aqueous acidic leaching solution used to leach the copper ore to form the PLS used in the present process. The organic solvent solution from extraction tank (2) is sent to series extraction tank E2 (5). The aqueous phase from series extraction tank E1 (3) is sent to series extraction tank E2 (5). The organic solvent solution from series extraction tank E2 (5) is sent to series extraction tank E1 (3), and the aqueous raffinate from series extraction tank E2 (5) is added to the aqueous acidic leaching solution used to leach the copper ore.

The aqueous acidic wash solution (aqueous acidic scrub solution) which is used in the practice of this invention contains at least a portion of aqueous electrolyte solution which as stated above can be pregnant (rich) electrolyte solution from the strip stage or strip electrolyte solution from the electrowinning stage. The wash solution is preferably a mixture of clean water and electrolyte solution in which the sulfuric acid content at equilibrium is between 5 to 30 gpl, preferably 7 to 20 gpl, and more preferably 10 to 16 gpl. Fresh water and either sulfuric acid or electrolyte solution can be added to the wash solution from time to time to maintain the above levels of sulfuric acid in the wash solution. Also, while it is preferred to use electrolyte from within the solvent extraction-electrowinning process to form the wash solution, the fresh wash solution can also be made up of dilute sulfuric acid or fresh water and concentrated sulfuric acid.

The copper metal treatment in accordance with the invention can be carried out with either the aqueous wash solution or the electrolyte solution used to form the aqueous wash solution.

Methods for contacting the aqueous wash solution or the electrolyte solution with copper metal that comprise part of the invention include the following:

1. Adding the copper metal directly to the settler or to the overflow weir in the wash stage so that the aqueous acidic wash solution flows over the copper metal.
2. Placing the copper metal in a column or tank exterior to the settler, and then pumping the aqueous acidic wash solution into the column or tank and then back to the settler.
3. Placing the copper metal inside a container, e.g. a box, mounted in the aqueous recycle line leading from the settler to the wash stage mixer.
4. Using an electrowinning cell in which the catholyte and anolyte are separated from each other by a semipermeable membrane. The catholyte will contain the recycling aqueous acidic wash solution and the anolyte will be water. In this embodiment, two cells can be used. One cell can be used to plate the copper while the other cell is turned off and the recirculating aqueous acidic wash solution is placed in contact with the copper cathode therein. For this embodiment, the EMEW cell(s) marketed by Electrometals Mining Limited, 23 Riversdale Rd, Oxenford, Queensland 4210, Australia, may be well suited for use herein. Standard EW cells containing a stainless steel knitmesh cathode may also be employed.

The copper metal can be in any convenient form, e.g. copper scrap, copper anodes, cement copper, copper mesh, and the like. In order to achieve effective contact, the copper is preferably in a form that provides sufficient surface area for good contact with the aqueous acidic wash solution. Cement copper is particularly advantageous if a source of acid mine drainage is available that contains at least some copper. The copper can be recovered by cementation as part of the treatment of the acid mine drainage.

The use of copper improves the iron scrubbing efficiency of the aqueous acidic wash solution to a significant degree, usually from 10 to 20%. The exact chemistry leading to increased iron scrubbing efficiency is not known, although it is known that the copper reduces Fe(III) to Fe(II) in the aqueous acidic wash solution. However, this reduction alone cannot be responsible for the enhanced iron scrubbing efficiency, since the use of sulfurous acid (from sodium sulfite) to reduce Fe(III) to Fe(II) does not improve the iron scrubbing efficiency of the aqueous acidic wash solution.

It has also been discovered that when the aqueous acidic wash solution is maintained at an elevated temperature, an even greater iron scrubbing efficiency was obtained. Temperatures of from 20 to 50° C., preferably from 20 to 40° C. can be used. However, operational temperatures can range from 10 to 50° C.

In the wash stage, the volume: volume ratio of the loaded organic solvent solution to the aqueous acidic wash solution can range from 10:1 to 125:1, preferably from 30:1 to 100:1, and more preferably 30:1 to 70:1. The aqueous acidic wash solution is recirculated from the settler to the mixer to preferably maintain an organic: aqueous volume ratio in the mixer of from about 0.9–1.1.

The benefit of increased iron scrubbing efficiency resulting from the practice of the invention means that wash times can be reduced, if desired, while still obtaining better efficiency for the wash stage than can be achieved by longer wash times using aqueous acidic wash solutions that have not been contacted with copper metal. Also, the bleed from lean electrolyte from the tankhouse can be reduced in quantity, resulting in a significant economic savings.

The extraction reagents present in the water-immiscible organic solvent solutions used in the practice of the invention typically include those containing one or more hydroxy aryl oxime extractants of the hydroxy aryl aldoxime or hydroxy aryl ketone oxime type.

Hydroxy aryl ketoxime extractants which may be employed as reagents for practice of the invention are those of Formulas I and II below:

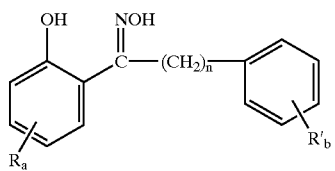

(I)

in which R and R' may be individually alike or different and are saturated aliphatic groups of 1–25 carbon atoms, ethylenically unsaturated aliphatic groups of 3–25 carbon atoms or —OR" where R" is a saturated or ethylenically unsaturated aliphatic group as defined; n is 0 or 1; and a and b are each 0, 1, 2, 3 or 4, with the proviso that both are not 0 and the total number of carbon atoms in $R_a$ and $R''_b$ is from 3 to 25,

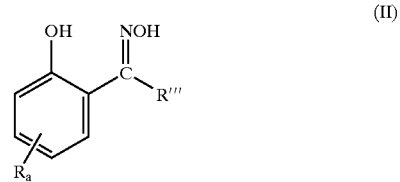

(II)

in which R and a are as defined with respect to Formula I and R''' is a saturated aliphatic group of 1–25 carbon atoms or an ethylenically unsaturated aliphatic group of 3–25 carbon atoms, with the proviso that the total number of carbon atoms in $R_a$ and R''' is from 3 to 25.

Preferred compounds of Formula I are those wherein a is 1, b is 0, R is a straight or branched chain alkyl group having from 7 to 12 carbon atoms, and wherein R is attached in a position para to the hydroxyl group. Among these, the more preferred are those wherein R is a mixture of isomers. Preferred compounds of Formula II are those wherein R''' is methyl and R and a are as designated as being preferred for compounds of Formula I.

Compounds of Formula I wherein n has a value of 0 (i.e., hydroxy benzophenone oxime compounds) may suitably be prepared according to the methods disclosed in Swanson U.S. Pat. Nos. 3,952,775 and 3,428,449. By reason of ease and economy of synthesis from available starting materials, ready solubility in organic diluents commonly employed in solvent extraction and desirable properties of complexes of the compounds with copper, preferred benzophenone oxime compounds of Formula I include those having a single alkyl ring substituent having from 7 to 12 carbon atoms in a position para to the hydroxy group, which alkyl substituent is a mixture of isomers. Examples of such compounds are 2-hydroxy-5-nonyl benzophenone oxime and 2-hydroxy-5-dodecyl benzophenone oxime which are obtained as mixtures of alkyl isomeric forms when commercial nonylphenol and dodecyl phenol are respectively employed in their synthesis.

Compounds of Formula I wherein n has a value of 1 (i.e., hydroxy phenyl benzyl ketone oxime compounds) may suitably be prepared according to the methods described in Anderson, U.S. Pat. No. 4,029,704. Preferred phenyl benzyl ketone oximes, like the above noted benzophenone oximes, are those having an isomeric mixture of 7 to 12 carbon alkyl groups as a single substituent on the ring para to the hydroxy group. These preferred compounds are exemplified by the compound, 2-hydroxy-5-nonylphenyl benzyl ketone oxime, as manufactured from a commercial nonylphenol comprising a mixture of nonyl isomeric forms.

Compounds of Formula II (i.e., hydroxy phenyl alkyl ketone oxime compounds) may suitably be prepared according to the procedures disclosed in U.K. Pat. No. 1,322,532. As noted with regard to benzophenone oxime and phenyl benzyl ketone oxime compounds of Formula I, preferred phenyl alkyl ketone oxime compounds of Formula II are those having an isomeric mixture of 7 to 12 carbon alkyl groups as a single substituent on the ring para to the hydroxyl group. Also preferred are compounds wherein the R''' alkyl group is methyl. Consequently, illustrative of preferred phenyl alkyl ketone oxime compounds is 2-hydroxy-5-nonyl phenyl methyl ketone oxime manufactured through use of commercial nonylphenol.

Hydroxy aryl aldoxime extractants which may be employed in reagents for practice of the invention are those of Formula III

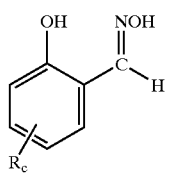

(III)

in which R is defined above with respect to Formulas I and II, c has a value of 1, 2, 3 or 4, and the total number of carbon atoms in $R_c$ is from 3 to 25. Preferred compounds of Formula III are those wherein c is 1, R is a straight or branched chain alkyl group having from 7 to 12 carbon atoms, and wherein R is attached in a position para to the hydroxyl group. Among these, the more preferred are those wherein R is a mixture of isomers.

Compounds of Formula III (i.e., hydroxy benzaldoxime compounds, sometimes referred to as "salicylaldoximes") may suitably be prepared according to the methods described in Ackerley, et al., U.S. Pat. No. 4,020,105 or Ackerley et al., U.S. Pat. No. 4,020,106 or by oximation of aldehydes prepared according to Beswick, U.S. Pat. No. 4,085,146. Again, preferred compounds are those having an isomeric mixture of isomeric 7 to 12 carbon alkyl groups as a single substituent para to the hydroxyl group. Mixed alkyl isomeric forms of 2-hydroxy-5-heptyl benzaldoxime, 2-hydroxy-5-octyl benzaldoxime, 2-hydroxy-5-nonyl benzaldoxime and 2-hydroxy-5-dodecyl benzaldoxime are thus preferred.

Reagents useful in the practice of the invention may include either kinetic additives or equilibrium modifiers or both. Preferred kinetic additives include α-hydroxy oximes described in Swanson, U.S. Pat. No. 3,224,873 and α, B-dioximes described in Koenders, et al., U.S. Pat. No. 4,173,616. Preferred equilibrium modifier chemicals include aliphatic alcohols such as tridecanol, alkyl phenols such as nonylphenol and organophosphorous compounds such as tributyl phosphate.

Reagents may include a single extractant chemical as illustrated above or may comprise mixtures of different aldoxime or ketoxime extractants of the type illustrated in U.S. Pat. Nos. 4,507,268, 4,544,532 and 4,582,689.

As indicated earlier the oxime extractant reagent is dissolved in an essentially water-immiscible, liquid hydrocarbon solvent and the resulting organic solution is contacted with the copper containing aqueous phase to extract at least a portion of the copper values into the organic phase. The phases are then separated and the copper values are stripped from the loaded organic phase by use of an aqueous stripping medium. Prior to stripping it is common to wash the loaded organic phase. The improvement of the present invention lies in the use of at least a portion of electrolyte in this aqueous wash or scrub stage wherein the electrolyte or aqueous wash has been previously contacted with copper metal.

A wide variety of essentially water-immiscible, liquid hydrocarbon solvents can be used in the metal recovery process of the present invention. These include: aliphatic and aromatic hydrocarbons such as kerosenes, benzene, toluene, xylene and the like. The choice of the said essentially water-immiscible liquid hydrocarbon solvent for particular commercial operations will depend on a number of factors such as the design of the solvent extraction plant (i.e., mixer-settlers, Podbielniak extractors, etc.), the value of the metal being recovered, disposal of plant effluent and the like.

The process of the present invention finds particular use in the extraction recovery of copper from solutions containing iron and chloride. Essentially, all of the major plants in operation currently for the recovery of Cu use mixer-settlers, with relatively large organic inventories and some loss of solvent invariably occurs by evaporation, entrainment in the aqueous and the like. Under these circumstances, preferred solvents for use in the metal recovery processes of the present invention are the aliphatic and aromatic hydrocarbons having flash points of 150° F. and higher and solubilities in water of less than 0.1% by weight. These solvents are chemically inert and the costs thereof are currently within practical ranges. Representative commercially available solvents are KERMAC™ 470B (an aliphatic kerosene available from Kerr-McGee-Flash Point 175° F.), Chevron Ion Exchange Solvent (available from Standard Oil of California-Flash Point 195° F.), ESCAID™ 100 and 110 (available from Exxon-Europe-Flash Point –180° F.), EXXSOL™ D 80 available from Exxon USA corresponds to ESCAID™ 110, NORPAR™ 12 (available from Exxon-U.S.A.-Flash Point 160° F.), Aromatic 150 (an aromatic kerosene available from Exxon U.S.A.-Flash Point 150° F.), Phillips ORFOM™ SX7, and SX12, available from Chevron-Phillips Chemical Co., and various other kerosenes and petroleum fractions available from other oil companies.

In the process of the present invention, the organic solvent solutions will preferably contain from 2 to 75% by weight of the extractant reagent and even more preferably from 5 to 20% by weight thereof. Additionally, volume ratios of the organic: aqueous phase vary widely since the contacting of any quantity of the reagent solution with the metal containing aqueous phase will result in extraction of metal values into the organic phase. However, for commercial practicality, the organic: aqueous phase ratios are preferably in the range of about 5:1 to 1:5. For practical purposes, the extracting and stripping are normally conducted at ambient temperatures and pressures although higher or lower temperatures and/or pressures are entirely operable. Most advantageously, the entire process can be carried out continuously with the stripped organic solvent solution being recycled for contacting further quantities of metal containing aqueous solution. The process may however, be carried out as a batch process where desirable.

The process improvement of the present invention is particularly applicable to extraction of copper from chloride solution. Illustrative of such chloride solution extraction is found on pages 227–229 and 312–313 of Process Metallurgy, Ritcey and Ashbrook, Solvent Extraction: Principles and Applications to Process Metallurgy, Part II, Elsevier Scientific Publishing Company. The invention is applicable to copper solutions containing from about 0.25–50 g/l copper, preferably from about 1–25 g/l copper.

To further illustrate the various objects and advantages of the present invention, the following examples are provided. It is understood that their purpose is entirely illustrative and in no way intended to limit the scope of the invention.

EXAMPLES

All of the following examples were carried out in a continuous laboratory solvent extraction system set up in a series-parallel configuration in accordance with the FIGURE, comprising one wash stage, one strip stage, one parallel extraction stage, two extraction stages arranged in series, and a loaded organic surge tank. The stripped organic solution was contacted with two volumes of pregnant leach solution (PLS). The stripped organic solution was first contacted in the parallel extraction stage with 1 volume of PLS, and then with a second volume of PLS in the two extraction stages arranged in series. The resulting loaded organic solution was then transferred to the wash stage to remove impurities therefrom, and then to the loaded organic surge tank. The washed loaded organic solution was then pumped to the strip stage where it was contacted with a strong acid solution (LE-lean electrolyte) to recover the copper ions.

Example 1

An organic phase was used consisting of LIX® 984N (a mixture of 2-hydroxy-5-nonyl acetophenone oxime and 5-nonyl salicylaldehyde (molar ratio 0.85:1) dissolved in CONOSOL™ 170E (petroleum fraction) to give a solution having a copper max load of 7.6 gpl against a standard aqueous feed solution (6 gpl Cu, 3 gpl Fe(III), pH 2.0).

The PLS was a typical leach solution obtained from a mining operation in the Southwestern US which contained between 1.98–2.04 gpl Cu and 4.7 gpl Fe. A synthetic aqueous solution containing 37.2 gpl Cu and 200 gpl sulfuric acid was prepared and used as the LE. The wash stage aqueous was obtained from a circuit operating at a mining operation in the Southwestern US. Its composition was 2.13 gpl Cu, 1.26 gpl Fe, and 8 gpl free sulfuric acid.

Process flowstreams were 39.2 ml/min of PLS to both the parallel extraction tank (2), and series extraction tanks E1 and E2 ((3) and (5) respectively in the FIGURE), 42.8 ml/min of organic, 11.3 ml/min of LE, and 1.3 ml/min of aqueous wash solution. Mixer retention times were 2 mins. in all stages.

The circuit was operated until analysis of the various process streams for copper and iron indicated that no further changes were occurring, indicating that the circuit was at steady state. Samples of the various aqueous and organic streams were analyzed for copper and iron by AAS (Atomic Absorption Spectroscopy). All redox measurements were made against an Ag/AgCl reference electrode.

The copper and iron values for the circuit streams under the above conditions are summarized in Table 1.

TABLE 1

| Stage | [Cu] (gpl) | [Fe] (ppm) | % Fe Scrubbing |
|---|---|---|---|
| Loaded Organic (LO) | 5.69 | 20.9 | — |
| Washed (LO) | 5.66 | 8.1 | 61.2 |
| Stripped Organic | 2.28 | 0 | — |
| EP Raffinate | 0.26 | N.D. | — |
| E Series Raffinate | 0.21 | N.D. | — |
| Wash aqueous* | 1.06 | 1260 | — |
| Rich Electrolyte | 48.2 | 8 | — |

*Emf was 617 mV indicating that essentially all of the iron was present as the ferric ion.

The above example was carried out without using the present invention, i.e. without contacting the wash stage aqueous with copper metal, for purposes of comparison.

Example 2

The process of Example 1 was repeated except that the wash stage was modified by attaching an external recycle loop, in which the aqueous wash solution was pumped from the wash stage settler through a glass column (¾" diameter× 5" long) containing 3.95 g of copper turnings (99.90 pct Cu, J. T. Baker) and returning the reduced wash aqueous to the settler. The flow rate of the wash stage aqueous in the external loop was 40 ml/min. The emf of the wash stage aqueous was 411 mV after startup of the recycle loop indicating essentially complete reduction of the iron (III) to iron (II).

The results obtained are set forth in Table 2.

TABLE 2

| Stage | [Cu] (gpl) | [Fe] (ppm) | % Fe Scrubbing |
|---|---|---|---|
| Loaded Organic | 5.79 | 20.5 | — |
| Washed LO | 5.82 | 5.5 | 73.2 |
| Stripped Organic | 2.42 | 0 | — |
| EP Raffinate | 0.26 | N.D. | — |
| E Series Raffinate | 0.21 | N.D. | — |
| Wash Aqueous | 1.06 | 1260 | — |
| Rich Electrolyte | 48.2 | 8 | — |

The results from Table 2 show that reducing the wash stage aqueous by passing it over copper metal improves iron scrubbing efficiency from 61.2% to 5 73.2%, a 20% improvement in iron scrubbing efficiency.

Example 3

The process of Example 2 was repeated except that the flow of aqueous wash solution was reduced to 0.5 m/min.

The results obtained are set forth in Table 3.

TABLE 3

| Stage | [Cu] (gpl) | [Fe] (ppm) | % Fe Scrub |
|---|---|---|---|
| Loaded Organic | 5.80 | 22.7 | — |
| Washed LO | 5.97 | 6.3 | 72.2 |
| Wash Aqueous | 1.05 | 2400 | — |

The above results show that even with a reduced flow of the aqueous wash solution, an 18% improvement in iron scrubbing efficiency was obtained. This reduced flow allows operation of the scrub stage over a broader range of conditions and results in savings of acid and copper in the wash stage operation.

Example 4

The process of Example 3 was repeated, except that an immersion heater was used to increase the temperature of the aqueous wash solution from 26° C. to 40° C. before passing the solution over the copper turnings.

The results obtained are set forth in Table 4.

TABLE 4

| Stage | [Cu] (gpl) | [Fe] (ppm) | % Fe Scrub |
|---|---|---|---|
| Loaded Organic | 5.94 | 21.1 | — |
| Washed LO | 6.04 | 3.7 | 82.4 |
| Wash Aqueous | 1.05 | 2400 | — |

This example shows that increasing the temperature of the aqueous wash solution increases the scrubbing efficiency of the solution.

Example 5

In this example, the circuit configuration was the same as that used in Example 1. Process flow streams were 39.2 ml/min of PLS to both the parallel and E1 extraction stages, 42.8 ml/min of organic, 11.3 ml/min of LE, and 0.5 ml/min of aqueous wash solution. Mixer retention times were 2 mins., in all stages.

The organic was comprised of LIX® 984N in CONOSOL™ 170E having a copper max load of 7.9 gpl Cu against a standard aqueous feed solution (6 gpl Cu, 3 gpl Fe(III), pH=2.0). The PLS was a typical leach solution obtained from a mining operation in the Southwestern US which contained between 1.98–2.04 gpl Cu and 4.7 gpl Fe. The LE was obtained from a mining operation in the Southwestern US and contained 30.8 gpl Cu, 1.90 gpl Fe, and 196 gpl of sulfuric acid. The wash stage aqueous was also obtained from a circuit operating at a mining operation in the Southwestern US. Its composition was 1.66 gpl Cu, 0.8 gpl Fe, and 9.5 gpl free sulfuric acid.

The results obtained are set forth in Table 5.

TABLE 5

| Stage | [Cu] (gpl) | [Fe] (ppm) | % Fe Scrubbing |
|---|---|---|---|
| Loaded Organic | 5.49 | 32.5 | — |
| Washed LO | 5.42 | 14.7 | 54.8 |
| Stripped Organic | 2.04 | 1.0 | — |
| EP Raffinate | 0.16 | N.D. | — |
| E Series Raffinate | 0.09 | N.D. | — |
| Wash Aqueous | 0.71 | 1950 | — |
| Rich Electrolyte | 42.8 | 1950 | — |

The above example was carried out without using the present invention, i.e. without contacting the wash stage aqueous with copper metal, for comparison purposes.

Example 6

The process of Example 5 was repeated except that the external recycle loop used in Example 2 was also used in the present example. 2 g. of iron wire was placed in the glass column present in the recycle loop. One liter of wash solution was pumped repeatedly through the column for several hours. The reduced wash solution contained 0.69 gpl Cu; thus 0.97 g of Cu was deposited on the wire. The column was then re-attached to the settler so that the aqueous in the settler could be used to recycle the aqueous out of the wash stage settler. The reduced solution was then used as aqueous in the wash stage.

The results are set forth in Table 6 below.

TABLE 6

| Stage | [Cu] (gpl) | [Fe] (ppm) | % Fe Scrubbing |
|---|---|---|---|
| Loaded Organic | 5.56 | 24.4 | — |
| Washed LO | 5.56 | 9.8 | 59.8 |
| Stripped Organic | 2.05 | 1.0 | — |
| EP Raffinate | 0.19 | N.D. | — |
| E Series Raffinate | 0.06 | N.D. | — |
| Wash Aqueous | 0.47 | 3900 | — |
| Rich Electrolyte | 44.3 | 1920 | — |

Even though the wash stage aqueous flow rate was low and the copper content of the wash stage aqueous was low, some improvement in the iron scrubbing efficiency was obtained.

Example 7

The process of Example 5 was repeated, except that 2 g. of sodium sulfite was added per liter of aqueous wash solution. This resulted in a reduction of the emf from 600 mV to 460 mV indicating that the iron was present essentially as ferrous ion. The sodium sulfite was converted to sulfurous acid when added to the solution as evidenced by the faint odor of sulfur dioxide. The reduced aqueous wash solution was used as the wash stage aqueous as in Example 5.

The results are set forth in Table 7.

TABLE 7

| Stage | [Cu] (gpl) | [Fe] (ppm) | % Fe Scrubbing |
|---|---|---|---|
| Loaded Organic | 5.40 | 35.0 | — |
| Washed LO | 5.43 | 17.1 | 51.1 |
| Stripped Organic | 1.99 | 1.0 | — |
| EP Raffinate | 0.15 | N.D. | — |
| E Series Raffinate | 0.05 | N.D. | — |
| Wash Aqueous | 0.51 | 2100 | — |
| Rich Electrolyte | 43.0 | 1940 | — |

No improvement in iron scrubbing efficiency is observed in this example. Since the emf shows that essentially all of the ferric iron was converted to ferrous iron, simple reduction of the iron in the wash stage to the ferrous cannot be the only factor contributing to the improvement in scrub efficiency when copper metal is used as the reducing agent.

What is claimed is:

1. In a solvent extraction process for the recovery of copper from an aqueous feedstock containing copper and iron values wherein the aqueous feedstock is contacted with an organic phase comprising a reagent composition including an extractant and in which a copper loaded organic phase is provided by extraction of said copper values from said aqueous feedstock and wherein contact between the aqueous feedstock and the organic phase is accomplished by means of at least one mixer-settler extraction stage and at least one strip stage to provide a pregnant copper electrolyte from which the copper is electrowon in an electrowinning stage to provide cathode copper and a stripped electrolyte, the improvement comprising washing said copper loaded organic phase in a wash stage prior to stripping said copper values therefrom with an aqueous acidic wash solution that has been contacted with copper metal prior to washing the copper loaded organic phase.

2. The process of claim 1 wherein the aqueous acidic wash solution comprises fresh water and pregnant electrolyte solution or lean electrolyte solution from the solvent extraction process.

3. The process of claim 1 wherein the aqueous acidic wash solution is heated and the heated aqueous acidic wash solution is contacted with the copper metal.

4. The process of claim 1 wherein contact with the copper metal is achieved by placing the copper metal in a container exterior to equipment used in the wash stage, passing the aqueous acidic wash solution into the container and returning the aqueous acidic wash solution to the wash stage.

5. The process of claim 1 wherein contact with the copper metal is achieved by pretreatment of the aqueous acidic wash solution with the copper metal prior to sending it to the wash stage.

6. The process of claim 1 wherein the copper metal is copper scrap, copper anodes, cement copper, or copper mesh.

7. The process of claim 1 wherein the aqueous acidic wash solution contains a volume ratio of water to electrolyte solution of from about 99:1 to about 80:20.

8. The process of claim 7 wherein said ratio is from about 90:10 to about 80:20.

9. The process of claim 1 wherein said aqueous feedstock is a chloride-containing feedstock.

10. The process of claim 1 wherein the organic phase comprises a petroleum fraction.

11. The process of claim 1 wherein the reagent composition comprises:
(a) one or more hydroxy aryl ketone oxime compounds of Formula I or II,

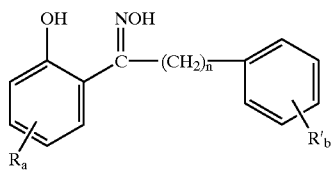

(I)

in which R and R' may be individually alike or different and are saturated aliphatic groups of 1–25 carbon atoms, ethylenically unsaturated aliphatic groups of 3–25 carbon atoms or —OR" where R" is a saturated or ethylenically unsaturated aliphatic group as defined; n is 0 or 1; and a and b are each 0, 1, 2, 3 or 4, with the proviso that both are not 0 and the total number of carbon atoms in $R_a$ and $R'_b$ is from 3 to 25,

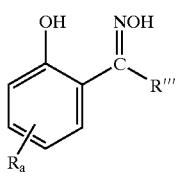

(II)

in which R and a are as defined with respect to Formula I and R'" is a saturated aliphatic group of 1–25 carbon atoms or an ethylenically unsaturated aliphatic group of 3–25 carbon atoms, with the proviso that the total number of carbon atoms in $R_a$ and R'" is from 3 to 25; and/or
(b) one or more hydroxy aryl aldoxime compounds of Formula III,

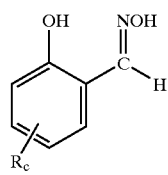

(III)

in which R is defined above with respect to Formulas I and II, c has a value of 1, 2, 3 or 4, and the total number of carbon atoms in $R_c$ is from 3 to 25.

12. The process of claim 11 wherein the reagent composition comprises 2-hydroxy-5-nonyl benzaldoxime.

13. The process of claim 11 wherein the reagent composition comprises 2-hydroxy-5-dodecyl benzaldoxime.

14. The process of claim 11 wherein the reagent composition comprises 2-hydroxy-5-nonyl phenyl methyl ketone oxime.

15. The process of claim 11 wherein the reagent composition is a mixture of 2-hydroxy-5-nonylbenzophenone oxime and 2-hydroxy-5-dodecyl benzaldoxime.

16. The process of claim 11 wherein the reagent is a mixture of 2-hydroxy-5-nonylbenzophenone oxime, 2-hydroxy-5-dodecyl benzaldoxime and 2-hydroxy-5-nonyl phenyl methyl ketone oxime.

17. In a solvent extraction process for the recovery of copper from an aqueous feedstock containing copper and iron values wherein the aqueous feedstock is contacted with an organic phase comprising a reagent composition including an extractant and in which a copper loaded organic phase is provided by extraction of said copper values from said aqueous feedstock and wherein contact between the aqueous feedstock and the organic phase is accomplished by means of at least one mixer-settler extraction stage and at least one strip stage to provide a pregnant copper electrolyte from which the copper is electrowon in an electrowinning stage to provide cathode copper and stripped electrolyte, the improvement comprising washing said copper loaded organic phase in a wash stage prior to stripping said copper values therefrom with an aqueous acidic wash solution that has been contacted with copper metal prior to washing the copper loaded organic phase, and wherein contact between the aqueous acidic wash solution and the copper metal is achieved by adding the copper metal to a settler in the wash stage or to an overflow weir in the wash stage.

18. In a solvent extraction process for the recovery of copper from an aqueous feedstock containing copper and iron values wherein the aqueous feedstock is contacted with an organic phase comprising a reagent composition including an extractant and in which a copper loaded organic phase is provided by extraction of said copper values from said aqueous feedstock and wherein contact between the aqueous feedstock and the organic phase is accomplished by means of at least one mixer-settler extraction stage and at least one strip stage to provide a pregnant copper electrolyte from which the copper is electrowon in an electrowinning stage to provide cathode copper and stripped electrolyte, the improvement comprising washing said copper loaded organic phase in a wash stage prior to stripping said copper values therefrom with an aqueous acidic wash solution that has been contacted with copper metal prior to washing the copper loaded organic phase; wherein the wash stage comprises a mixer, a settler, and an aqueous recycle line leading from the settler to the mixer, and contact with the copper metal is achieved by placing the copper metal inside a container which is mounted in said aqueous recycle line.

19. In a solvent extraction process for the recovery of copper from an aqueous feedstock containing copper and iron values wherein the aqueous feedstock is contacted with an organic phase comprising a reagent composition including an extractant and in which a copper loaded organic phase is provided by extraction of said copper values from said aqueous feedstock and wherein contact between the aqueous feedstock and the organic phase is accomplished by means of at least one mixer-settler extraction stage and at least one strip stage to provide a pregnant copper electrolyte from which the copper is electrowon in an electrowinning stage to provide cathode copper and stripped electrolyte, the improvement comprising washing said copper loaded organic phase in a wash stage prior to stripping said copper values therefrom with an aqueous acidic wash solution that has been contacted with copper metal prior to washing the copper loaded organic phase; wherein contact with the copper metal is achieved by pretreatment of the aqueous acidic wash solution with the copper metal prior to sending it to the wash stage by using an electrowinning cell containing a copper coated cathode in which catholyte and anolyte are separated from each other by a semipermeable membrane, and wherein the anolyte is water and the catholyte is the aqueous acidic wash solution.

* * * * *